(12) United States Patent
Zhang et al.

(10) Patent No.: US 11,831,701 B1
(45) Date of Patent: Nov. 28, 2023

(54) EXTENDED REALITY DEVICE IDENTIFICATION BY INTERNET GATEWAY

(71) Applicant: T-MOBILE INNOVATIONS LLC, Overland Park, KS (US)

(72) Inventors: Lin Zhang, Overland Park, KS (US); Ming Shan Kwok, Seattle, WA (US); Yasmin Karimli, Kirkland, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/102,327

(22) Filed: Jan. 27, 2023

(51) Int. Cl.
*G06F 13/00* (2006.01)
*H04L 65/80* (2022.01)
*H04L 65/1069* (2022.01)
*H04W 88/06* (2009.01)

(52) U.S. Cl.
CPC .......... *H04L 65/80* (2013.01); *H04L 65/1069* (2013.01); *H04W 88/06* (2013.01)

(58) Field of Classification Search
CPC ..... H04L 65/80; H04L 65/1069; H04W 88/16
USPC ................................ 709/227, 228, 224, 203
See application file for complete search history.

(56) References Cited

U.S. PATENT DOCUMENTS

2021/0311844 A1* 10/2021 Daniali ................ H04N 13/332
2023/0070882 A1*  3/2023 Youn ................... H04L 65/1073

* cited by examiner

*Primary Examiner* — Kenneth R Coulter
(74) *Attorney, Agent, or Firm* — SHOOK, HARDY & BACON L.L.P.

(57) ABSTRACT

Methods and systems are provided for differentiating an XR device from other devices when initiating communications with an Internet gateway. Initially the XR device sends a probe request to the Internet gateway, where the probe request includes an identifier of the device type and network requirements of the XR device. It is determined that the particular device type and network requirements in the probe request are supported by the Internet gateway, and is communicated to the XR device in the form of a probe response. A communication session is set up between the XR device, the Internet gateway, and a network, the communication session including QoS control based on the device type and network requirements of the XR device.

20 Claims, 8 Drawing Sheets

EXTENDED REALITY DEVICE IDENTIFICATION BY INTERNET GATEWAY

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

Aspects provided herein are directed to ensuring that devices that use immersive services, also referred to as extended reality (XR) devices, including virtual reality (VR) devices, augmented reality (AR) devices, and mixed reality (MR) devices, when connected to a Wi-Fi hotspot, are able to meet their specific quality of service (QoS) guarantee. For background, these XR devices have specific requirements on throughput, latency, jitter, packet loss/error, etc. When connecting to an Internet gateway, such as a Wi-Fi hotspot, a device identifies itself with an identifier associated with an access network type. The Internet gateway uses that identifier and maps it to the data network name (DNN) and access point name (APN), designated for XR devices. This allows the Internet gateway to establish a protocol data unit (PDU) session and packet data network (PDN) connectivity for the XR device. In aspects, identifying as an XR device to the Internet gateway allows the XR device to meet its specific QoS guarantee by achieving high throughput, low latency/jitter, and low packet loss/error.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Aspects of the present disclosure provide a way to distinguish XR devices from other devices when the XR devices try to connect to an Internet gateway, such as a Wi-Fi hotspot. In aspects herein, DNNs and APNs are created that are specific to XR devices, so that XR devices meet their specific requirements and are provided with high throughput, low latency/jitter, and low packet loss and error. Meeting these requirements allows for QoS guarantees to be met. In order for the Internet gateway to distinguish an XR device from any other device (e.g., mobile phone, tablet) that is requesting to connect to the Internet gateway, the XR devices are able to provide an access network type that is specific to XR devices. For example, in aspects, a first access network type may be used for VR devices, a second access network type may be used for AR devices, a third access network type may be used for MR devices, and so on. This allows the Internet gateway to know that the requesting device (e.g., XR device communicating a probe request to the Internet gateway) requires certain DNNs and APNs. As used herein, the definition of an access network type can be found in IEEE Std 802.11u-2011.

In some aspects, the Internet gateway may not recognize the access network type sent by the XR device. In one instance, the Internet gateway may not respond to the XR device by way of a probe response within a predetermined amount of time (e.g., timer), which may cause a fallback mechanism to occur. Here, the XR device sends a second (retry) probe request to the Internet gateway, but this time, not with an access network type associated with an XR device, but instead with a default value. The XR device would not receive the level of services that it requires (low latency/jitter, high throughput, low packet loss/error), but at least it may be able to connect to the Internet gateway.

In another instance of the Internet gateway not recognizing the access network type, the Internet gateway may respond with a probe response, but indicating that the access network type is a default value, which could be any other device other than an XR device (e.g., mobile phone, tablet). Again, the XR device would not receive the level of services that it requires (low latency/jitter, high throughput, low packet loss/error), but at least it may be able to connect to the Internet gateway.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an eNodeB or a 5G connection with a gNodeB). In this regard, typically only one active uplink connection can occur per frequency. The base station may include one or more sectors served by individual transmitting/receiving components associated with the base station (e.g., antenna arrays controlled by an eNodeB). These transmitting/receiving components together form a multi-sector broadcast arc for communication with mobile handsets linked to the base station.

As used herein, "base station" or "node" or "access point" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 900 described herein with respect to FIG. 9.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In a first aspect, a method is provided for differentiating an XR device from other devices when initiating communications with an Internet gateway. The method includes receiving a probe request from an XR device, where the probe request includes an identifier indicating a device type and network requirements of the XR device. The method also includes determining that the device type and the network requirements of the XR device are supported by the Internet gateway, and communicating a probe response to the XR device indicating that the device type and the network requirements of the XR device are supported by the Internet gateway. Further, the method includes setting up a communication session between the XR device, the Internet gateway, and a network, where the communication session includes QoS control based on the identifier indicating the device type and the network requirements of the XR device.

In a second aspect, a system is provided for differentiating an XR device from other devices when initiating communications with an Internet gateway. The system includes one or more processors and one or more computer storage hardware devices storing computer-usable instructions, that, when used by the one or more processors, cause the one or more processors to perform a method. The method includes receiving a first probe request from an XR device, where the probe request includes a first identifier indicating a type and network requirements of the XR device. The method also includes determining that the Internet gateway does not support the type and the network requirements of the XR device. Further, the method includes communicating a probe response to the XR device indicating that the Internet gateway does not support the type and the network requirements of the XR device, and setting up a communication session between the XR device, the Internet gateway, and a network, where the communication session includes QoS control based on a default type and default network requirements.

In a third aspect, a method is provided for differentiating an XR device from other devices when initiating communications with an Internet gateway. The method includes receiving a first probe request from an XR device, where the probe request including a first identifier indicating a type and network requirements of the XR device. The method also includes, after a threshold amount of time, receiving a second probe request from the XR device, where the second probe request includes a second identifier indicating a default device type and default network requirements. Further, the method includes communicating a probe response to the XR device indicating that the default device type and the default network requirements are supported by the Internet gateway, and setting up a communication session between the XR device, the Internet gateway, and a network. The communication session includes QoS control based on the default device type and the default network requirements.

Figure 1:
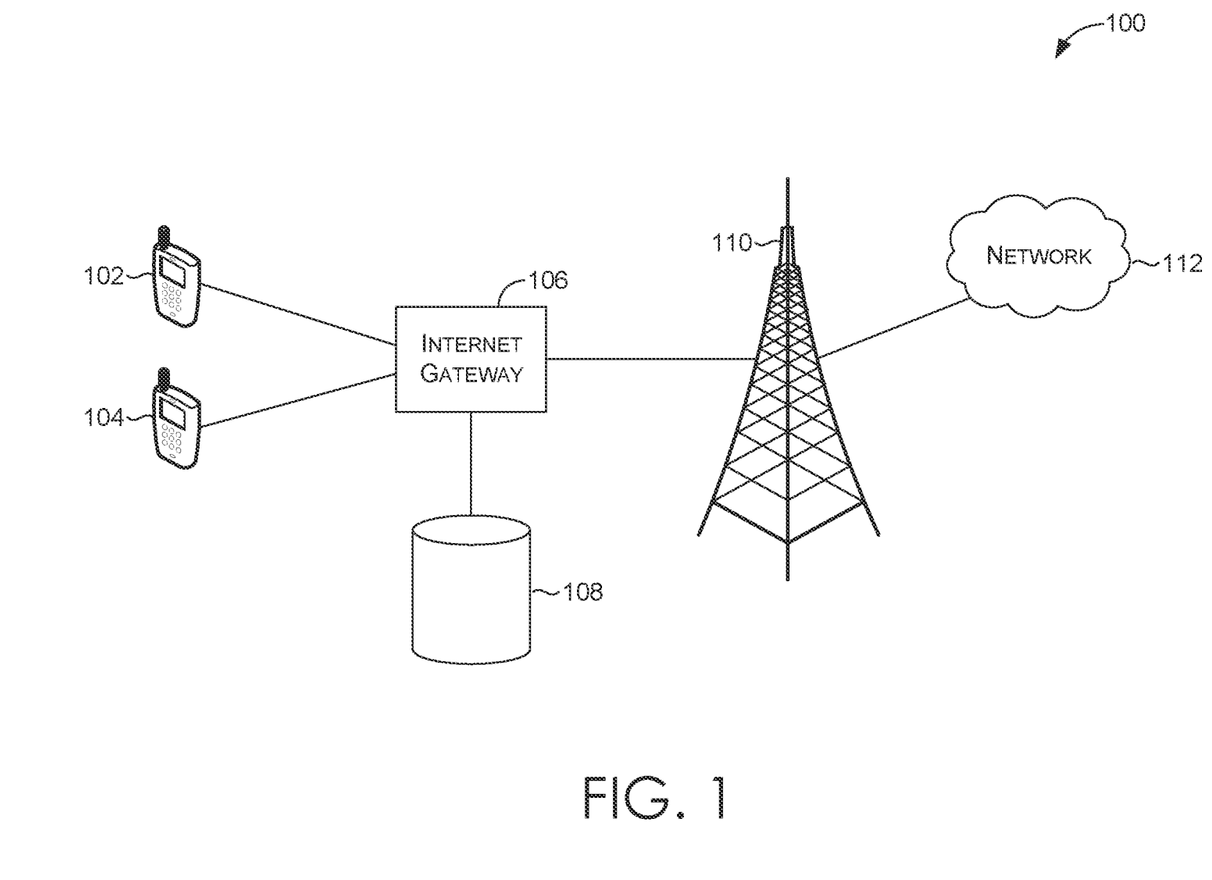
FIG. 1 depicts a diagram of an exemplary network environment in which implementations of the present disclosure may be employed, in accordance with aspects herein.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes XR devices 102 and 104. In network environment 100, XR devices 102 and 104 may take on multiple forms, such as cameras, microphones, sensors, googles, and glasses, to name a few, or any other device (such as the computing device (900) that communicates via wireless communications with Internet gateway 106 in order to interact with a public or private network.

Figure 9:
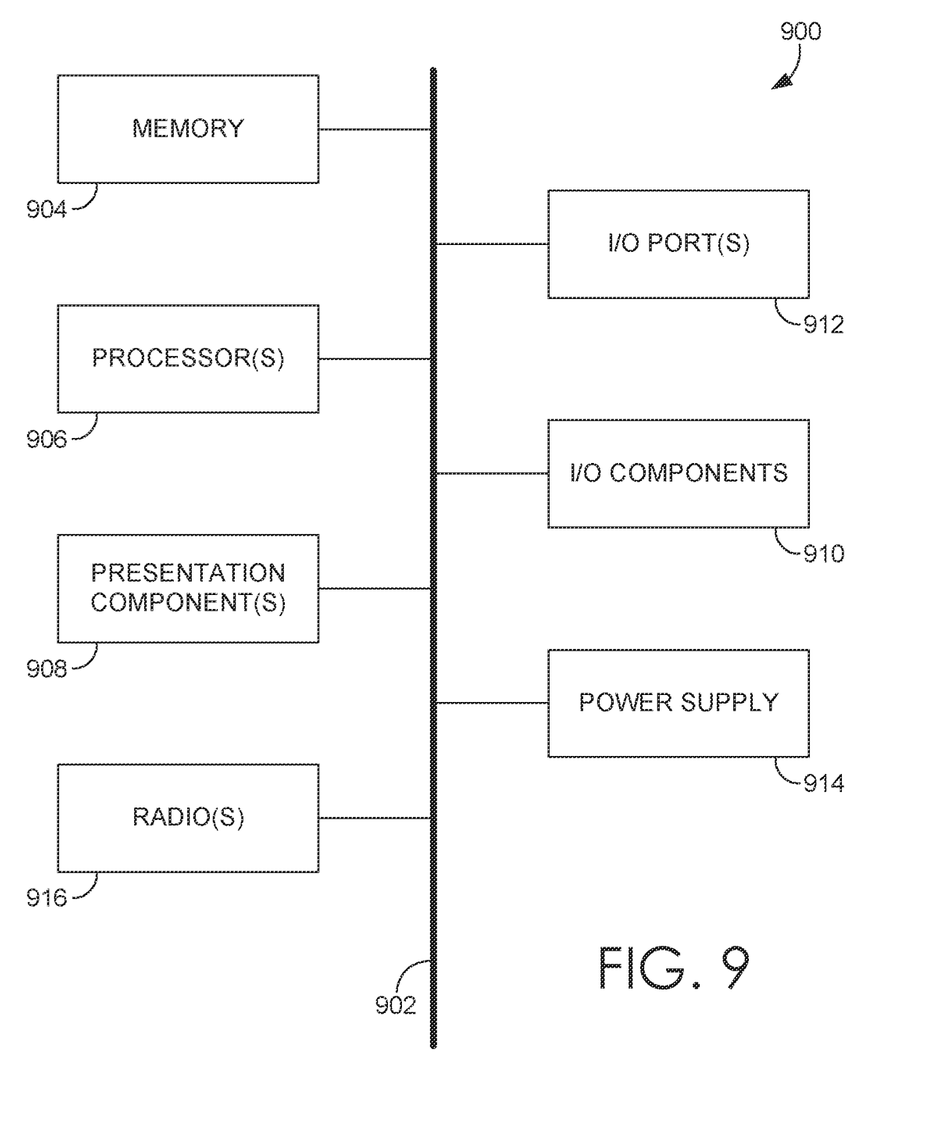
FIG. 9 depicts an exemplary computing device suitable for use in implementations of the present disclosure, in accordance with aspects herein.

In some aspects, each of the XR devices 102 and 104 may correspond to computing device 900 in FIG. 9. Thus, an XR device can include, for example, a display(s), a power source(s) (e.g., a battery), a data store(s), a speaker(s), memory, a buffer(s), a radio(s) and the like. In some implementations, for example, an XR devices 102 and 104 comprise a wireless or mobile device with which a wireless telecommunication network(s) can be utilized for communication (e.g., voice and/or data communication). In this regard, the XR devices can be any mobile computing device that communicates by way of a wireless network, for example, a 3G, 4G, 5G, 6G, LTE, CDMA, or any other type of network. In some cases, XR devices 102 and 104 in network environment 100 can optionally utilize one or more communication channels (not shown) to communicate with other computing devices (e.g., a mobile device(s), a server(s), a personal computer(s), etc.) through Internet gateway 106 and node 110. Node 110 may be a gNodeB, eNodeB, or the like.

The network environment 100 may be comprised of a telecommunications network(s) 112, or a portion thereof. A telecommunications network 112 might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The communication channels (not shown) can be part of a telecommunication network that connects subscribers to their immediate telecommunications service provider (i.e., home network carrier). In some instances, the communication channels are associated with a telecommunications provider that provides services (e.g., 3G network, 4G network, LTE network, 5G network, 6G network, and the like) to XR devices 102 and 104. For example, the communication channels may provide voice, SMS, and/or data services to XR devices 102 and 104, or corresponding users that are registered or subscribed to utilize the services provided by the telecommunications service provider. Some devices, such as XR devices 102 and 104, connect to Internet gateway 106 and receive telecommunications services through this device. The communication channels can comprise, for example, a 1×circuit voice, a 3G network (e.g., CDMA, CDMA2000, WCDMA, GSM, UMTS), a 4G network (WiMAX, LTE, HSDPA), or a 5G network or a 6G network.

In some implementations, node 110 is configured to communicate with XR devices 102 and 104, by way of Internet gateway 106, that are located within the geographic area, or cell, covered by radio antennas of node 110. Node 110 may include one or more base stations, base transmitter stations, radios, antennas, antenna arrays, power amplifiers, transmitters/receivers, digital signal processors, control electronics, GPS equipment, and the like. In particular, node 110 may selectively communicate with the user devices using dynamic beamforming.

Internet gateway 106 provides device connectivity to the wireless network to devices, including XR devices 102 and 104 through pairing with those devices. Pairing is the process where a WiFi device obtains the service set identifier (SSID) and the name of the WiFi network. In one aspect, Internet gateway 106 is a WiFi hotspot that provides Internet connectivity to XR devices 102 and 104. When connected to the Internet gateway 106, the paired device obtains internet protocol (IP) based communications from the network through the Internet gateway 106.

As shown, node 110 is in communication with Internet gateway 106 and at least a network 112 via a backhaul channel. As the XR devices 102 and 104 collect individual status data, the status data can be automatically communicated by each of the XR devices 102 and 104 to the node 110. Node 110 may store the data communicated by the XR devices 102 and 104 in database 108. Status data for XR devices 102 and 104 may be communicated to node 110 through Internet gateway 106. Alternatively, node 110 may automatically retrieve the status data from the XR devices 102 and 104. The data may be communicated or retrieved and stored periodically within a predetermined time interval which may be in seconds, minutes, hours, days, months, years, and the like. With the incoming of new data, database 108 may be refreshed with the new data every time, or within a predetermined time threshold so as to keep the status data stored in database 108 current.

Internet gateway 106 is configured to retrieve signal information, XR device information, latency information, including quality of service (QoS) information, and metrics from node 110 or one of the XR devices, such as XR devices 102 and 104.

A WiFi network is an internet connection through Internet gateway 106 that is shared with multiple devices, including XR devices and other non-XR devices. The Internet gateway 106 may be connected to an internet modem to provide internet protocol (IP) services to the connected devices. The Internet gateway 106 acts as a hub to broadcast the internet signal to all WiFi enabled devices within range of the network coverage area.

In aspects herein, XR devices 102 and 104 desire to make a connection with Internet gateway 106, which can provide Internet services to the devices. When sending a probe request to Internet gateway 106, a device includes an identifier that corresponds to an access network type needed for that devices. For example, exemplary access network types may be a numerical value corresponding to one of a private network, a private network with guest access, a chargeable public network, a free public network, a personal device network, an emergency services only network, a test or experimental network, a wildcard network, etc. For XR devices, the access network type indicates a type of XR device, as different XR devices (e.g., MR device, VR device, AR device) have different QoS requirements.

Figure 2:
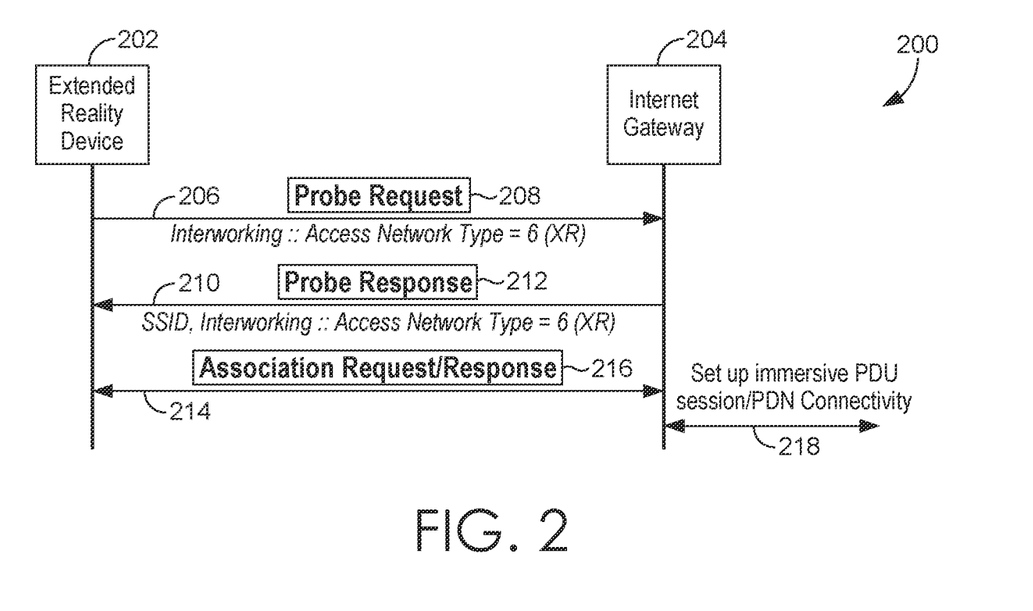
FIG. 2 depicts a connection setup diagram of the Internet gateway supporting the access network type associated with an XR device, in accordance with aspects herein.

FIG. 2 depicts a connection setup diagram 200 of the Internet gateway 204 supporting the access network type associated with an XR device 202, in accordance with aspects herein. XR device 202 initially communicates 206 a probe request 208 to Internet gateway 204. The probe request 208 is a probe request frame containing an interworking element with Access Network Type subfield set to 6, which indicates to the Internet gateway 204 what type of QoS services are required for the XR device 202. The Internet gateway 204 responds with a probe response 212 that is communicated 210 to the XR device 202. The probe response 212 may include an acknowledgement of the access network type provided to the XR device 202. Here, the access network type subfield set to 6 in the probe response 212 matches that of the probe request 208, indicating that the access network type requested is recognized by the Internet gateway 204. Association requests/responses 216 are communicated 214 back and forth between the XR device 202 and the Internet gateway 204. The Internet gateway 204 then sets up the immersive PDU session (or PDN connectivity), as shown by numeral 218.

Figure 3:
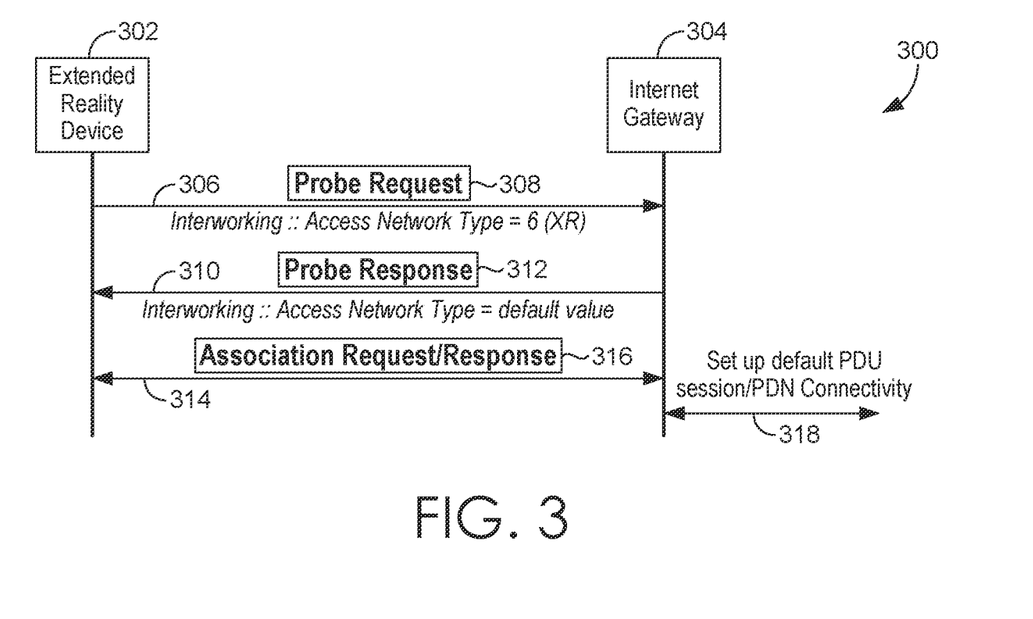
FIG. 3 depicts a connection setup diagram of an aspect where the Internet gateway does not support the access network type associated with an XR device, in accordance with aspects herein.

FIG. 3 depicts a connection setup diagram 300 of an aspect where the Internet gateway 304 does not support the access network type associated with an XR device 302, in accordance with aspects herein. XR device 302 initially communicates 306 a probe request 308 to Internet gateway 304. The probe request 308 is a probe request frame containing an interworking element with Access Network Type subfield set to 6, and indicates to the Internet gateway 304 what type of QoS services are required for the XR device 302. The Internet gateway 304 responds with a probe response 312 that is communicated 310 to the XR device 302. The probe response 312, here, does not indicate that the access network type is that requested by the XR device 302, but instead is a default value, which could indicate that the Internet gateway 304 does not recognize the access network type requested by the XR device 302. As such, the XR device 302 is able to connect to the Internet gateway 304, but may not receive the QoS services requested by the XR device 302. Association requests/responses 316 are communicated 314 back and forth between the XR device 302 and the Internet gateway 304. The Internet gateway 304 then sets up the default PDU session with PDN connectivity, as shown by numeral 318.

Figure 4:
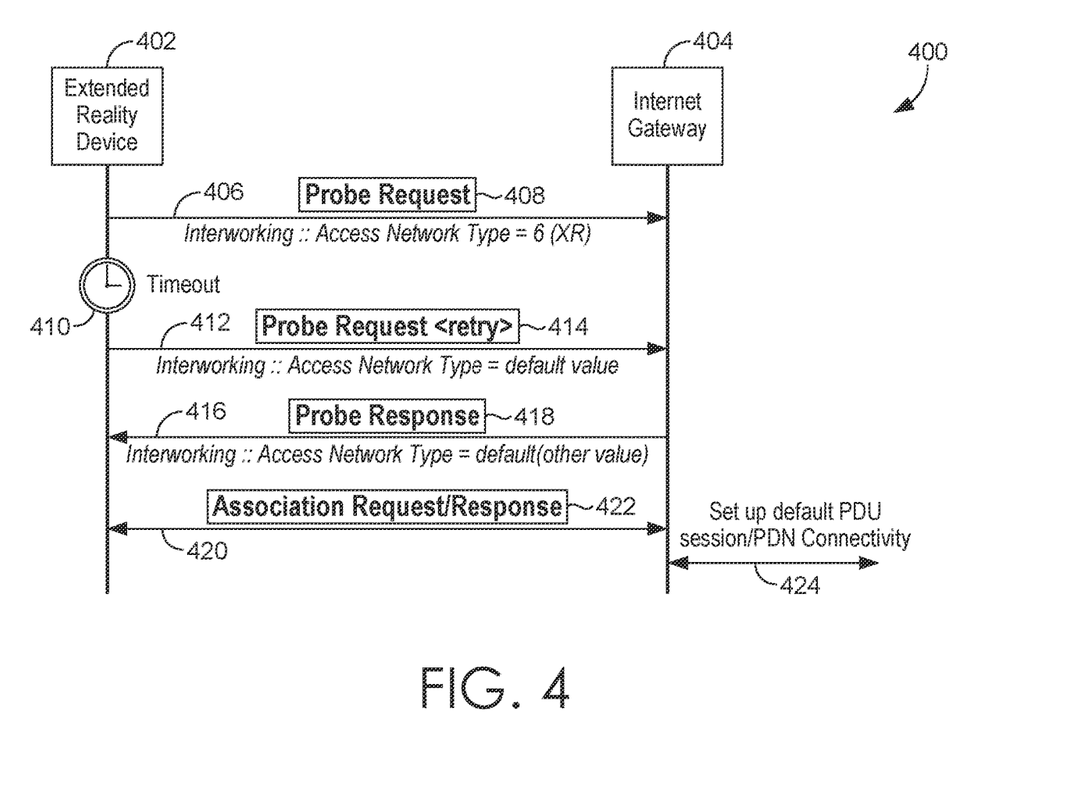
FIG. 4 depicts a connection setup diagram of another aspect where the Internet gateway does not support the access network type associated with an XR device, in accordance with aspects herein.

FIG. 4 depicts a connection setup diagram 400 of another aspect where the Internet gateway 404 does not support the access network type associated with an XR device 402, in accordance with aspects herein. Initially, the XR device 402 communicates 406 a probe request 408 to the Internet gateway 404. The probe request 408 is a probe request frame containing an interworking element with Access Network Type subfield set to 6. A timer is set on the XR device's 402 end that times out when a predetermined amount of time has passed without a response from the Internet gateway 404. The XR device 202 then communicates 412 a second probe request 414 as a retry request to the Internet gateway 404, but this time, with a default value for the access network type. This allows the XR device 402 to receive some services from Internet gateway 404, even though the QoS requirement of the XR device 402 may not be met. The Internet gateway 404 communicates 416 a probe response 418 to the XR device 402 confirming the default access network type. Association requests/responses 422 are communicated 420 back and forth between the XR device 402 and the Internet gateway 404. The Internet gateway 404 then sets up the default PDU session with PDN connectivity, as shown by numeral 424.

Figure 5:
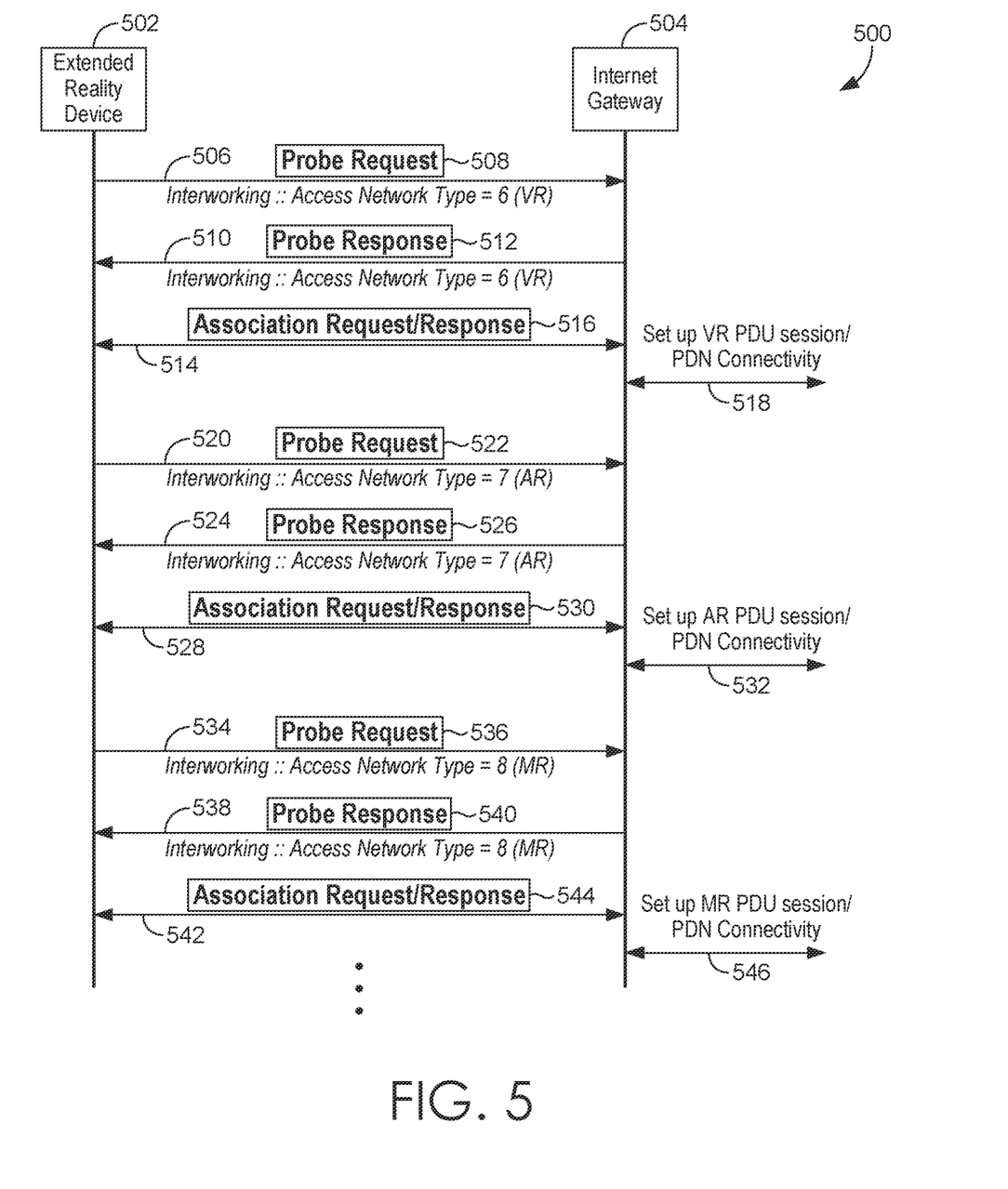
FIG. 5 depicts a connection setup diagram of where the Internet gateway supports access network type associated with a VR device, an AR device, and an MR device, in accordance with aspects herein.

FIG. 5 depicts a connection setup diagram 500 where the Internet gateway supports access network type associated with an XR device, e.g., a VR device, an AR device, and an MR device, in accordance with aspects herein. The XR device 502 communicates 506 a probe request 508 to the Internet gateway 504, where the probe request 608 is a probe request frame containing an interworking element with Access Network Type subfield set to 6. The numerical value of 6 is provided for exemplary purposes only, not for limitation. The numerical value could be any value not currently used. The Internet gateway 504 communicates 510 a probe response 512 confirming the Access Network Type subfield is set to 6. Association requests/responses 516 are communicated 514 back and forth between the XR device 502 and the Internet gateway 504. The Internet gateway 504 then sets up the default PDU session (or PDN connectivity), as shown by numeral 518. The next two scenarios are similar to the previous scenario with the VR device, but the XR device 502 is either an AR device or an MR device. For example, XR device 502 communicates 520 a probe request 522 to Internet gateway 504, where the probe request 522 is a probe request frame containing an interworking element with Access Network Type subfield set to 7. Again, the numerical value of 7 is provided for exemplary purposes only. The Internet gateway 504 communicates 524 a probe response 526 confirming the access network type of 7 (AR). Association requests/responses 530 are communicated 528 back and forth between the XR device 502 and the Internet gateway 504. The Internet gateway 504 then sets up the default PDU session (or PDN connectivity), as shown by numeral 532.

Similarly, XR device 502 communicates 534 a probe request 536 to Internet gateway 504, where the probe request 208 is a probe request frame containing an interworking element with Access Network Type subfield set to 8. The numerical value of 8 is provided for exemplary purposes only. The Internet gateway 504 communicates 538 a probe response 540 confirming the access network type of 8 (MR). Association requests/responses 544 are communicated 542 back and forth between the XR device 502 and the Internet gateway 504. The Internet gateway 504 then sets up the default PDU session with PDN connectivity, as shown by numeral 546.

Figure 6:
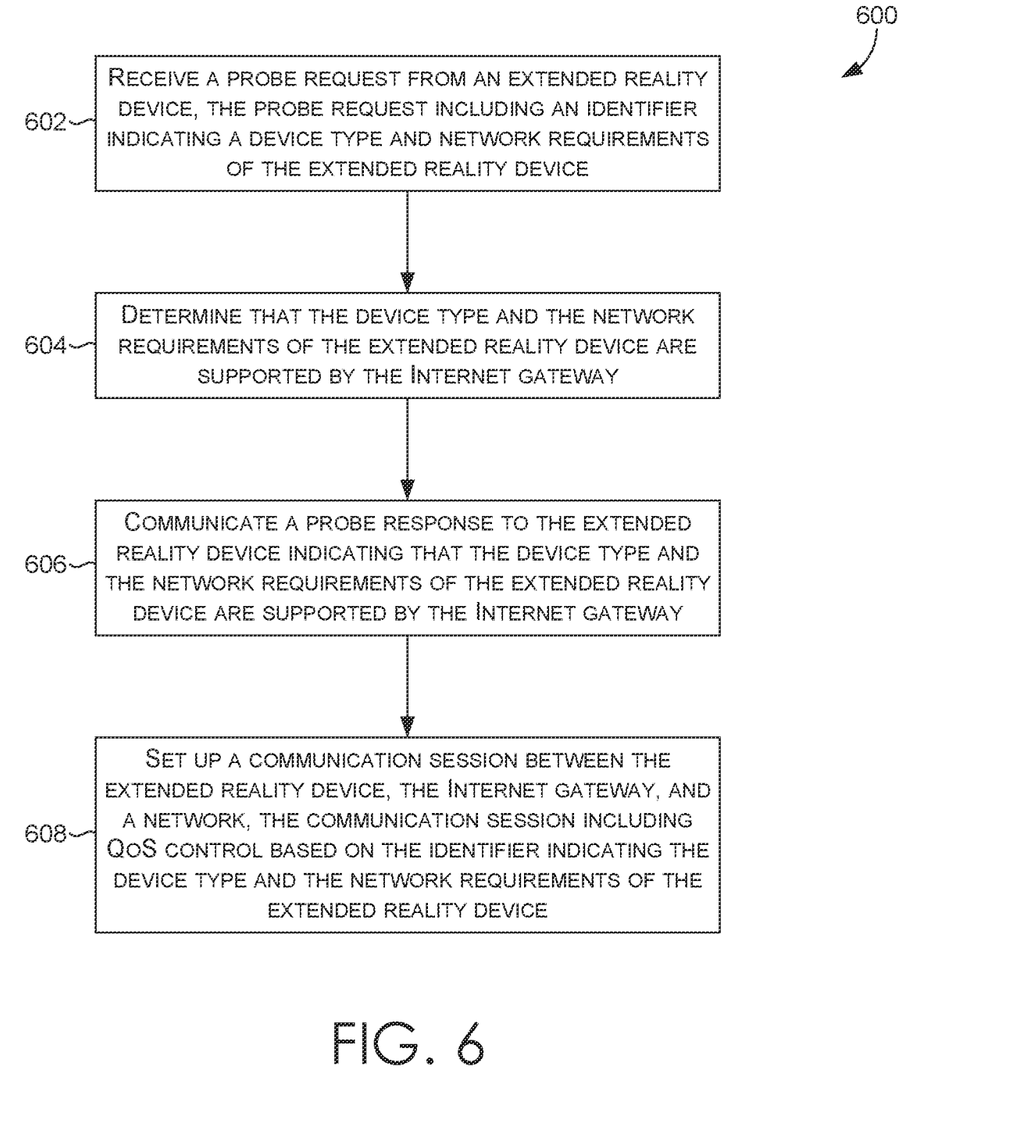
FIG. 6 is a flow diagram of an exemplary method for differentiating an XR device from other devices, in accordance with aspects herein.

FIG. 6 is a flow diagram of an exemplary method 600 for differentiating an XR device from other devices, in accordance with aspects herein. Initially at block 602, a probe request is received from an XR device, the probe request including an identifier indicating a device type and network requirements of the XR device. The identifier may be unique for each type of device, and as such, an XR device may have a different identifier than a non-XR device, and different XR device types may have different identifiers. In aspects herein, the XR device may be an AR device, a VR device, an MR device, and the like. The probe request may initiate, for the XR device, an active scan on a Wi-Fi network. At block 604, it is determined that the device type (e.g., AR device, a VR device, an MR device) and the network requirements of the XR device are supported by the Internet gateway. Network requirements may include, for example, throughput, latency, jitter, packet loss, or packet error, and may indicate minimum requirements for traffic handling between the Internet gateway and the XR device. At block 606, a probe response is communicated to the XR device indicating that the device type and the network requirement of the XR device are supported by the Internet gateway. In one aspect herein, the Internet gateway is a Wi-Fi hotspot. The probe response is communicated in response to the active scan on the Wi-Fi network to which the Internet gateway is attached. A communication session is set up at block 608 between the XR device, the Internet gateway, and the communication session, including QoS control based on the identifier indicating the device type and network requirement of the XR device. In one aspect, the communication session is a PDU session (or PDN connectivity) that includes the network requirements of the XR device.

Figure 7:
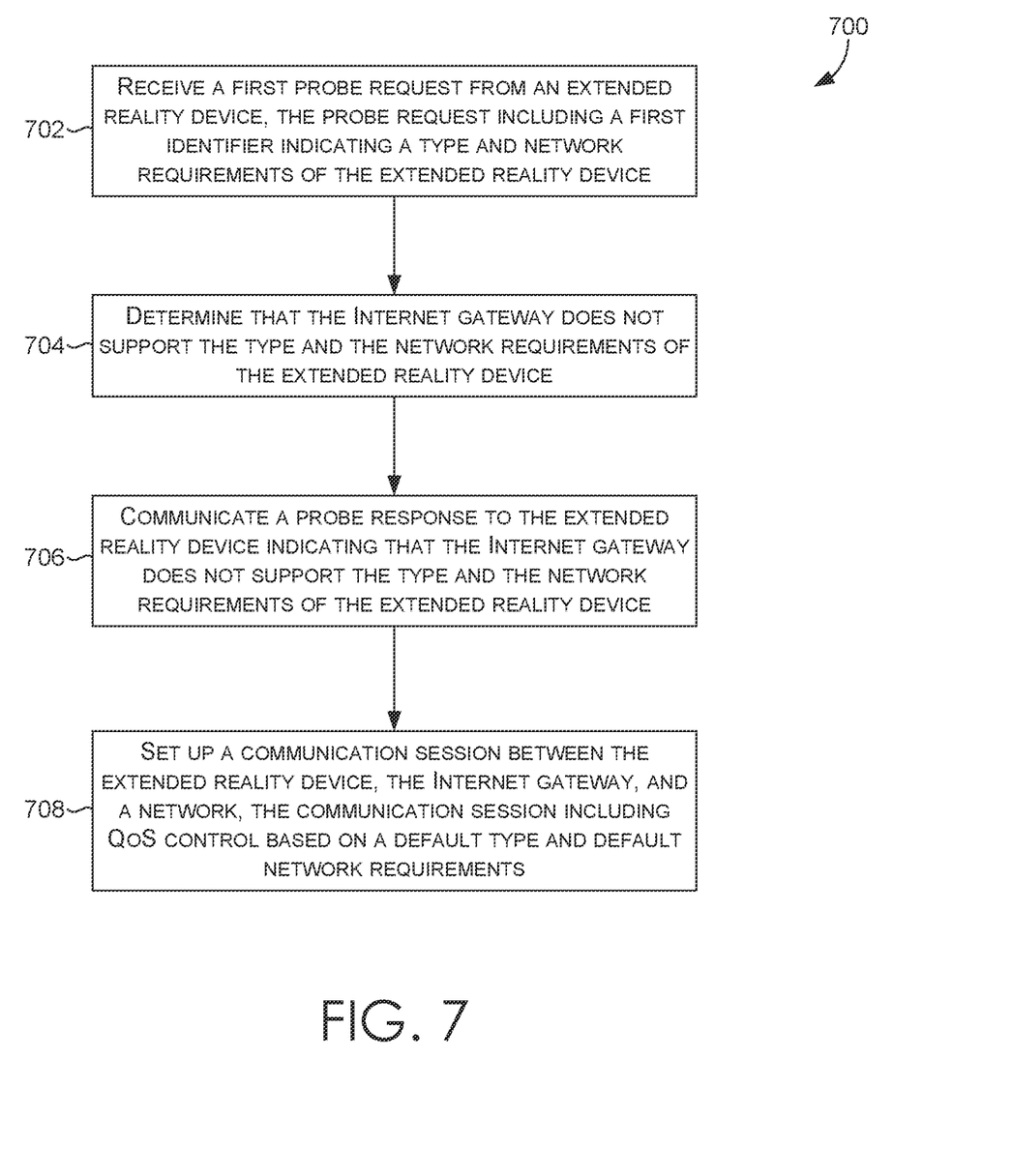
FIG. 7 is a flow diagram of another exemplary method for differentiating an XR device from other devices, in accordance with aspects herein.

FIG. 7 is a flow diagram of another exemplary method 700 for differentiating an XR device from other devices, in accordance with aspects herein. At block 702, a first probe request is received from an XR device. The probe request may include a first identifier indicating a type and network requirements of the XR device. For example, the XR device may be an AR device, VR device, MR device, etc. The network requirements may include throughput latency, jitter, packet loss, packet error, or the like. The probe request effectively initiates a scan of a Wi-Fi network. At block 704, it is determined that the Internet gateway does not support the type and the network requirements of the XR device. At block 706, a probe response is communicated to the XR device indicating that the Internet gateway does not support the type and the network requirements of the XR device. The probe response is communicated in response to the active scan on the Wi-Fi network to which the Internet gateway is attached. To indicate that the Internet gateway does not support the type and network requirements of the XR device, the probe response includes an access network type identifier associated with a default device type, which may be a device other than an XR device. At block 708, a communication session is set up between the XR device, the Internet gateway, and the network. The communication session may include QoS control based on a default type and default network requirements.

Figure 8:
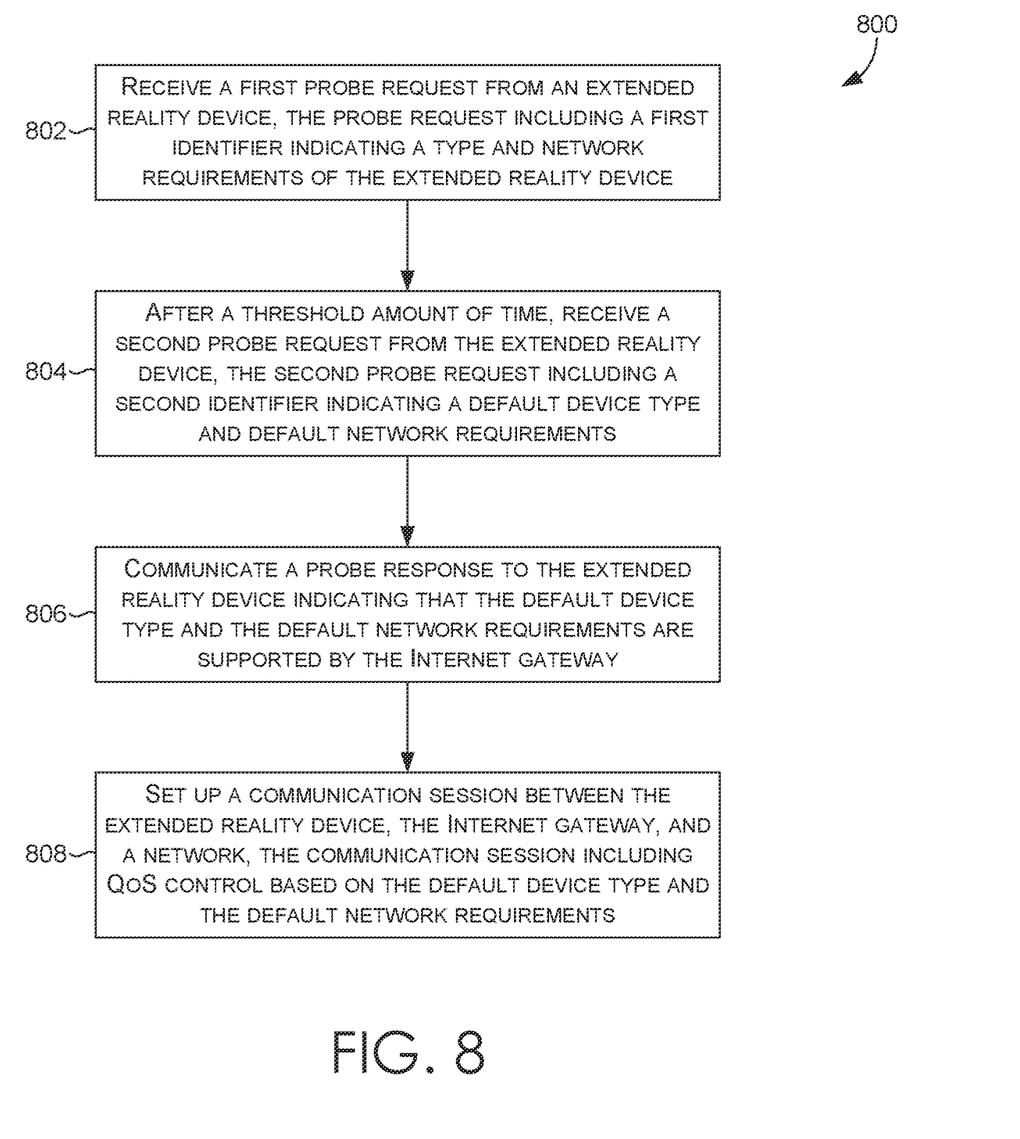
FIG. 8 is a flow diagram of another exemplary method for differentiating an XR device from other devices, in accordance with aspects herein.

FIG. 8 is a flow diagram of another exemplary method 800 for differentiating an XR device from other devices, in accordance with aspects herein. At block 802, a first probe request is received from an XR device, where the probe request includes a first identifier indicating a type and network requirements of the XR device. At block 804, after a threshold amount of time, such as upon expiration of a timer, a second probe request s received from the XR device. The second probe request includes a second identifier indicating a default device type and default network requirements. A probe response is communicated to the XR device at block 806. The probe response indicates that the default device type and network requirements are supported by the Internet gateway, which may indicate that the type and network requirements requested by the XR device in the first probe request are not supported by the Internet gateway. At step 808, a communication session is set up between the XR device, the Internet gateway, and a network. The communication session may include QoS control based on the default device type and the default network requirements.

FIG. 9 depicts an exemplary computing device suitable for use in implementations of the present disclosure, in accordance with aspects herein. With continued reference to FIG. 9, computing device 900 includes bus 902 that directly or indirectly couples the following devices: memory 904, one or more processors 906, one or more presentation components 908, input/output (I/O) ports 912, I/O components 910, radio 916, and power supply 914. Bus 902 represents what may be one or more busses (such as an address bus, data bus, or combination thereof). Although the devices of FIG. 9 are shown with lines for the sake of clarity, in reality, delineating various components is not so clear, and metaphorically, the lines would more accurately be grey and fuzzy. For example, one may consider a presentation component such as a display device to be one of I/O components 910. Also, processors, such as one or more processors 906, have memory. The present disclosure hereof recognizes that such is the nature of the art, and reiterates that FIG. 9 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 9 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 904 includes computer-storage media in the form of volatile and/or nonvolatile memory. Memory 904 may be removable, nonremovable, or a combination thereof. Exemplary memory includes solid-state memory, hard drives, optical-disc drives, etc. Computing device 900 includes one or more processors 906 that read data from various entities such as bus 902, memory 904 or I/O components 910. One or more presentation components 908 present data indications to a person or other device, including the goggles of an XR device. Exemplary one or more presentation components 908 include a display device, speaker, printing component, vibrating component, etc. I/O ports 912 allow computing device 900 to be logically coupled to other devices including I/O components 910, some of which may be built into computing device 900. Illustrative I/O components 910 include a microphone, joystick, game pad, satellite dish, scanner, printer, wireless device, etc.

The radio 916 represents one or more radios that facilitate communication with a wireless telecommunications network. While a single radio 916 is shown in FIG. 9, it is contemplated that there may be more than one radio 916 coupled to the bus 902. In aspects, the radio 916 utilizes a transmitter to communicate with the wireless telecommunications network. It is expressly conceived that a computing device with more than one radio 916 could facilitate communication with the wireless telecommunications network via both the first transmitter and an additional transmitters (e.g. a second transmitter). Illustrative wireless telecommunications technologies include CDMA, GPRS, TDMA, GSM, and the like. The radio 916 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 916 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for differentiating an extended reality (XR) device from other devices when initiating communications with an Internet gateway, the method comprising:
   receiving a probe request from the XR device, the probe request including an identifier indicating a device type and network requirements of the XR device;
   determining that the device type and the network requirements of the XR device are supported by the Internet gateway;
   communicating a probe response to the XR device indicating that the device type and the network requirements of the XR device are supported by the Internet gateway; and
   setting up a communication session between the XR device, the Internet gateway, and a network, the communication session including QoS control based on the identifier indicating the device type and the network requirements of the XR device.

2. The method of claim 1, wherein the XR device is one or more of a virtual reality device, an augmented reality device, or a mixed reality device.

3. The method of claim 2, wherein the device type corresponds to one of the virtual reality device, the augmented reality device, or the mixed reality device.

4. The method of claim 1, wherein the network requirements comprise at least one of throughput, latency, jitter, packet loss, or error.

5. The method of claim 1, wherein the identifier of the XR device is different than a type of a non-XR device.

6. The method of claim 1, wherein the communication session is a PDU session that includes the network requirements of the XR device.

7. The method of claim 1, wherein the Internet gateway is a WiFi hotspot.

8. The method of claim 1, wherein the network requirements indicate minimum requirements for traffic handling between the Internet gateway and the XR device.

9. The method of claim 1, wherein the probe request initiates an active scan on a WiFi network.

10. The method of claim 9, wherein the probe response is communicated in response to the active scan on the WiFi network to which the Internet gateway is attached.

11. A system for differentiating an XR device from other devices when initiating communications with an Internet gateway, the system comprising:
one or more processors; and
one or more computer storage hardware devices storing computer-usable instructions, that, when used by the one or more processors, cause the one or more processors to:
receive a probe request from the XR device, the probe request including a first identifier indicating a device type and network requirements of the XR device;
determine that the Internet gateway does not support the device type and the network requirements of the XR device;
communicate a probe response to the XR device indicating that the Internet gateway does not support the device type and the network requirements of the XR device; and
set up a communication session between the XR device, the Internet gateway, and a network, the communication session including QoS control based on a default device type and default network requirements.

12. The system of claim 11, wherein the Internet gateway is a WiFi hotspot.

13. The system of claim 11, wherein the XR device is one or more of a virtual reality device, an augmented reality device, or a mixed reality device.

14. The system of claim 13, wherein the device type corresponds to one of the virtual reality device, the augmented reality device, or the mixed reality device.

15. The system of claim 11, wherein the network requirements comprise at least one of throughput, latency, jitter, packet loss, or error.

16. The system of claim 11, wherein the probe request initiates an active scan on a WiFi network.

17. The system of claim 16, wherein the probe response is communicated in response to the active scan on the WiFi network to which the Internet gateway is attached.

18. The system of claim 11, wherein the probe response to the XR device indicating that the Internet gateway does not support the device type and the network requirements of the XR device comprises the default device type and the default network requirements.

19. A method for differentiating an XR device from other devices when initiating communications with an Internet gateway, the method comprising:
receiving a first probe request from the XR device, the first probe request including a first identifier indicating a device type and network requirements of the XR device;
after a threshold amount of time, receiving a second probe request from the XR device, the second probe request including a second identifier indicating a default device type and default network requirements;
communicating a probe response to the XR device indicating that the default device type and the default network requirements are supported by the Internet gateway; and
setting up a communication session between the XR device, the Internet gateway, and a network, the communication session including QoS control based on the default device type and the default network requirements.

20. The method of claim 19, wherein the Internet gateway does not respond to the first probe request, which indicates that the Internet gateway does not support the device type and the network requirements of the XR device.

* * * * *